(12) United States Patent
Saito

(10) Patent No.: US 12,273,615 B2
(45) Date of Patent: Apr. 8, 2025

(54) LENS SYSTEM FOR REDUCING A SHAKE INDUCED BY A TOUCH-DOWN OPERATION

(71) Applicant: TAMRON CO., LTD., Saitama (JP)

(72) Inventor: Tomoharu Saito, Saitama (JP)

(73) Assignee: TAMRON CO., LTD., Saitama (JP)

( * ) Notice: Subject to any disclaimer, the term of this patent is extended or adjusted under 35 U.S.C. 154(b) by 65 days.

(21) Appl. No.: 17/988,392

(22) Filed: Nov. 16, 2022

(65) Prior Publication Data

US 2023/0209175 A1 Jun. 29, 2023

(30) Foreign Application Priority Data

Dec. 24, 2021 (JP) .................................. 2021-211480

(51) Int. Cl.
| | |
|---|---|
| *H04N 23/62* | (2023.01) |
| *G06F 3/0488* | (2022.01) |
| *H04M 1/724* | (2021.01) |
| *H04N 23/63* | (2023.01) |
| *H04N 23/67* | (2023.01) |
| *H04N 23/69* | (2023.01) |

(52) U.S. Cl.
CPC .......... *H04N 23/62* (2023.01); *G06F 3/0488* (2013.01); *H04M 1/724* (2021.01); *H04N 23/631* (2023.01); *H04N 23/675* (2023.01); *H04N 23/69* (2023.01); *G06F 2203/04104* (2013.01); *H04M 2201/42* (2013.01)

(58) Field of Classification Search
None
See application file for complete search history.

(56) References Cited

U.S. PATENT DOCUMENTS

| | | | |
|---|---|---|---|
| 9,819,856 B2* | 11/2017 | Guo | H04N 23/62 |
| 2006/0029381 A1* | 2/2006 | Onozawa | H04N 23/673 |
| | | | 348/E5.045 |
| 2011/0019058 A1* | 1/2011 | Sakai | H04N 23/70 |
| | | | 348/E5.022 |
| 2014/0118601 A1* | 5/2014 | Myung | H04N 23/675 |
| | | | 348/333.11 |
| 2016/0261788 A1* | 9/2016 | Mizukami | H04N 23/633 |
| 2018/0131878 A1* | 5/2018 | Charlton | G11B 27/11 |
| 2019/0302986 A1* | 10/2019 | Iwasa | H04N 23/631 |

FOREIGN PATENT DOCUMENTS

JP 2016-127524 A 7/2016

* cited by examiner

*Primary Examiner* — Quan Pham
(74) *Attorney, Agent, or Firm* — Paratus Law Group, PLLC

(57) ABSTRACT

A lens system includes: a lens; an operation terminal separated from the lens, the operation terminal including a touch panel; and a controller that controls the lens in accordance with a gesture command input to the touch panel.

9 Claims, 8 Drawing Sheets

LENS SYSTEM FOR REDUCING A SHAKE INDUCED BY A TOUCH-DOWN OPERATION

CROSS-REFERENCE TO RELATED APPLICATIONS

This application is based on and claims the benefit of priority from Japanese Patent Application No. 2021-211480, filed on Dec. 24, 2021, the entire contents of which are incorporated herein by reference.

BACKGROUND OF THE INVENTION

Technical Field

The present invention relates to a lens system.

Related Art

In recent years, opportunities for people to capture videos have increased with the spread of video posting sites. Video capturing is performed in a situation where an individual captures himself/herself as a subject (so-called "selfie"), and is also performed in a situation where a camera man or a focus puller who is specialized in capturing separately from a subject captures a short movie. In either situation, an imaging device that can perform capturing with a simple operation is often preferred.

As such an imaging device, for example, JP 2016-127524 A describes an imaging device that includes a touch display that receives an instruction from a user and executes a command associated with a touch-down operation.

SUMMARY OF THE INVENTION

However, the touch display to which the touch-down operation is input is built in the imaging device in the conventional technique described in JP 2016-127524 A, and thus, there is a problem that the touch-down operation induces a shake of a lens.

The invention has been made in view of the above-described problem, and an object thereof is to provide a technique capable of controlling a lens by a simple operation while reducing or avoiding a shake.

In order to solve the above problem, a lens system according to an aspect of the invention includes: a lens; an operation terminal separated from the lens, the operation terminal including a touch panel; and a controller configured to control the lens in accordance with a gesture command input to the touch panel.

According to the aspect of the invention, it is possible to provide the technique capable of controlling the lens by the simple operation while reducing or avoiding the shake.

DESCRIPTION OF THE EMBODIMENTS

Hereinafter, an embodiment of the invention will be described in detail.

(Configuration of Lens System)

Figure 1:
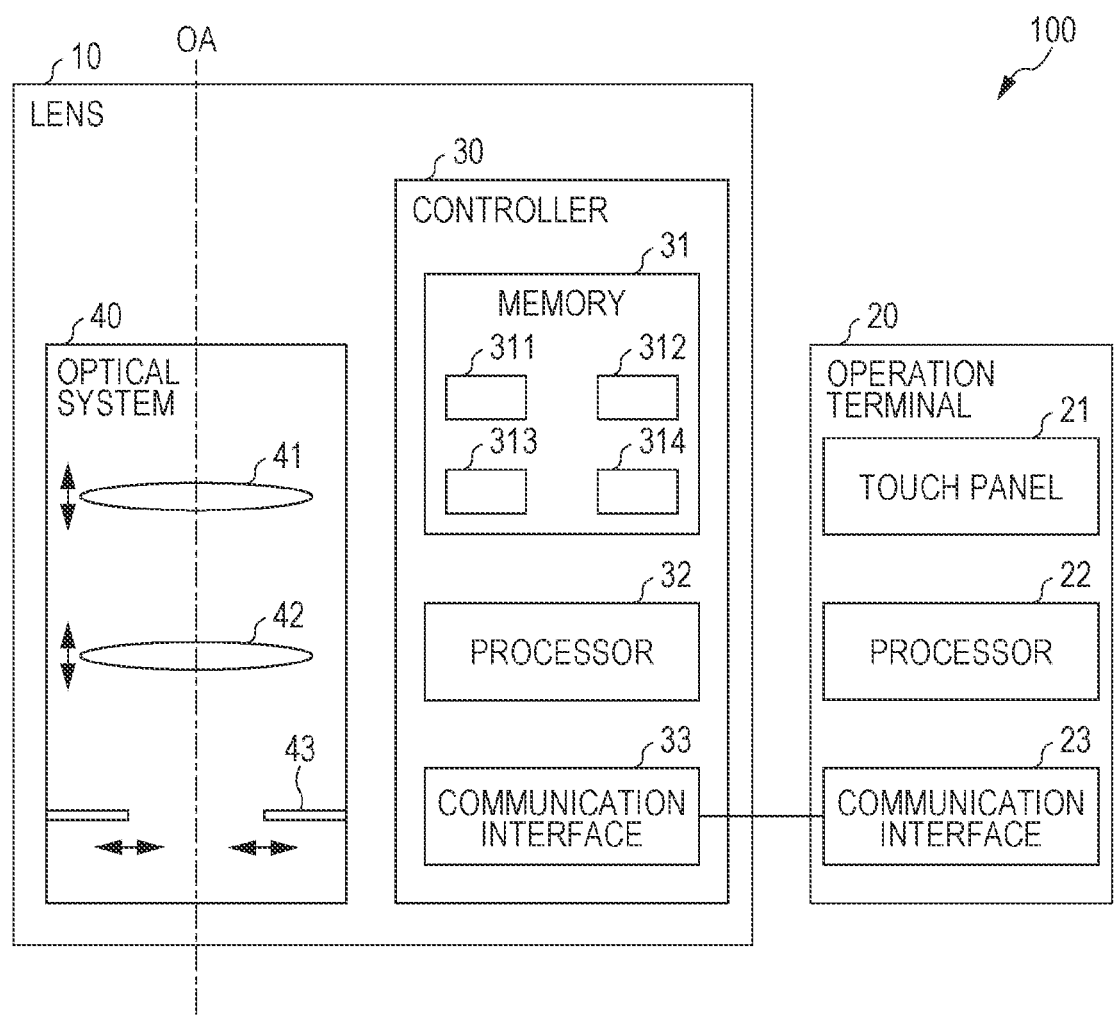
FIG. 1 is a block diagram illustrating a configuration of a lens system according to an embodiment of the invention.

A configuration of a lens system 100 according to the embodiment of the invention will be described with reference to FIG. 1. FIG. 1 is a block diagram illustrating a configuration of the lens system 100 according to an embodiment of the invention. The lens system 100 is a system configured to control a lens to suitably obtain an image of a subject in at least one of still image capturing and video capturing. In the present specification, a "lens" refers to a lens unit including at least one single lens and a lens barrel surrounding the at least one single lens.

As illustrated in FIG. 1, the lens system 100 includes a lens 10 and an operation terminal 20. The lens 10 and the operation terminal 20 are communicably connected to each other via a communication unit. In the embodiment, the lens 10 and the operation terminal 20 are connected by a universal serial bus (USB) cable via a communication interface 33 included in the lens 10 and a communication interface 23 included in the operation terminal 20.

Although the USB cable is used as the communication unit connecting the lens 10 and the operation terminal 20 in the embodiment, the invention is not limited thereto. The communication unit connecting the lens 10 and the operation terminal 20 may be any unit capable of mediating transmission and reception of electronic data between the lens and the operation terminal, and may be either a wired communication unit or a wireless communication unit. Specific examples of the wireless communication unit include Wi-Fi (registered trademark) communication, near field communication (NFC), Bluetooth (registered trademark) communication, and the like. In addition, the communication unit may directly connect the lens and the operation terminal or may indirectly connect the lens and the operation terminal. Examples of a network that can be interposed between the lens 10 and the operation terminal 20 include a local area network (LAN).

In a case where the communication unit connecting the lens 10 and the operation terminal 20 is a cable in the invention, it is preferable that the length of the cable be such a length that the vibration of the operation terminal 20 does not substantially propagate to the lens 10. The length of the cable is, for example, 0.1 m or more, 0.5 m or more, 1 m or more, 2 m or more, 5 m or more, or 10 m or more and 100 m or less, but is not limited thereto.

The operation terminal 20 is configured to allow a user to input a gesture command as an instruction with respect to the lens system 100. In the embodiment, a smartphone is used as the operation terminal 20. As illustrated in FIG. 1, the operation terminal 20 is separated from the lens 10 and includes a touch panel 21, a processor 22, and the communication interface 23.

In the present specification, the "gesture command" refers to an operation whose content is identified by a trajectory of a finger in contact with a touch panel. Even if start points of trajectories are different, it is interpreted that gesture commands have the same content as long as shapes of the trajectories are the same. Here, the user may directly touch a touch panel existing as a device, or may touch a virtual touch panel implemented on a computer using a pointing device.

The touch panel 21 is configured to allow the user to input the gesture command. In the embodiment, the touch panel 21 is an electronic component in which a touch sensor to which the user inputs the gesture command and a display that displays a control state of the lens system 100 to the user are integrally combined. As a conversion system in the touch sensor, a known method such as a resistive film system, an electrostatic capacitance system, a surface acoustic wave system, an infrared system, an electromagnetic induction system, an image recognition system, or an optical sensor system can be appropriately adopted. As the display, a known display, such as a liquid crystal display or an organic electroluminescent (EL) display, can be used.

The processor 22 is configured to control the overall operation of the operation terminal 20. The processor 22 is, for example, a central processing unit (CPU), a graphics processing unit (GPU), or a combination thereof. The processor 22 mainly executes processing on the operation terminal 20 side in a control process S1 by developing and executing a control processing program P20 stored in a memory of the operation terminal 20.

The communication interface 23 is configured to control transmission of various types of data from the operation terminal 20 and reception of various types of data by the operation terminal 20. In the embodiment, a USB interface is used as the communication interface 23.

Note that the operation terminal 20 is not limited to the smartphone, and may be any terminal having a touch panel. Examples of the operation terminal 20 other than the smartphone include a tablet personal computer (PC), a personal digital assistant (PDA), a smart watch, and the like.

Although the electronic component in which the touch sensor and the display are integrally combined is used as the touch panel 21 in the embodiment, the invention is not limited thereto. In the touch panel 21, the touch sensor and the display may be separated. An example of the operation terminal 20 including the touch panel 21 in which the touch sensor and the display are separated is a PC provided with a touch pad. In addition, the touch panel 21 may include only the touch sensor. An example of the operation terminal 20 that includes the touch panel 21 with only the touch sensor is a gimbal (stabilizer) for a camera equipped with a touch sensor. In addition, the touch sensor is not limited to an electronic component that mediates a direct input using a finger, and may be an electronic component that allows an indirect input. Examples of the electronic component that allows an indirect input include a mouse and a touch pen.

The lens 10 is a lens that can be mounted on a camera, and is configured to form an image of a subject on an image sensor provided in the camera. In the embodiment, a zoom lens that is detachably mounted on the camera is used as the lens 10. As illustrated in FIG. 1, the lens 10 includes a controller 30 built in the lens 10 and an optical system 40.

The controller 30 is configured to control the lens 10 in accordance with the gesture command input by the user. The control process S1 executed by the controller 30 will be described later with reference to another drawing. In the embodiment, a micro controller unit (MCU) is used as the controller 30. As illustrated in FIG. 1, the controller 30 includes a memory 31, a processor 32, and a communication interface 33.

Note that the configuration in which the controller 30 is built in the lens 10 will be described hereinafter, but the controller 30 may be built in the camera on which the lens 10 is mounted. In the configuration in which the controller 30 is built in the camera, the controller 30 is communicably connected to the optical system 40, which will be described later, by mount communication via a mount on which the lens 10 is mounted, the mount being provided in the camera.

The memory 31 is configured to store preset information. In the embodiment, the memory 31 includes a primary memory and a secondary memory. The primary memory has a function of storing the preset information in a volatile manner. The secondary memory has a function of storing the control processing program P10 in a non-volatile manner. In the embodiment, a dynamic random access memory (DRAM) is used as the primary memory, and a flash memory is used as the secondary memory. As illustrated in FIG. 1, the memory 31 includes four storage areas 311, 312, 313, and 314 as functional configurations of the primary memory. Note that the preset information stored in the primary memory may be held in a non-volatile memory such as an electronically erasable and programmable read only memory (EEPROM, registered trademark) when the power is turned off so as to be held even when the power of the power of the memory 31 is turned off, and be restored from the EEPROM to the primary memory when the power is turned on.

The control processing program P10 may be stored on a remote server instead of the secondary memory included in the memory 31. In such a case, the control processing program P10 may be supplied from the server to the controller 30 via any wired or wireless transmission medium. In addition, the four storage areas 311, 312, 313 and 314 may be included not in the memory 31 of the controller 30 but in the memory of the operation terminal 20. In such a case, the preset information may be provided to the controller 30 via the communication interface 23.

Although the number of storage areas provided in the memory 31 is four in the embodiment, the invention is not limited thereto. It is sufficient that the number of storage areas provided in the memory 31 is one or more, and the number may be, for example, 1, 2, 3, 4, 5, 6, or more. In addition, the number of storage areas may be configured to be customizable by the user via the control processing program P10 and P20 in accordance with a purpose. For example, the user may set the number of storage areas to three in one capturing, and may set the number of storage areas to eight in another capturing.

The processor 32 is configured to control the overall operation of the lens 10. The processor 32 mainly executes processing on the lens 10 side in the control process S1 by developing the control processing program P10 stored in the memory 31. In the embodiment, a CPU is used as the processor 32.

The communication interface 33 is configured to control transmission of various types of data from the lens 10 and reception of various types of data by the lens 10. In the embodiment, the USB interface is used as the communication interface 33.

The optical system 40 is a group of optical elements arranged on an optical axis OA passing through a subject. As illustrated in FIG. 1, the optical system 40 includes a focus group 41, a zoom group 42, and a diaphragm 43 as the optical elements. In the optical system 40, a relative positional relationship among the focus group 41, the zoom group 42, and the diaphragm 43 is not limited to the positional relationship illustrated in FIG. 1, and can be appropriately modified.

The focus group 41 is the optical element configured to change a focus position of entire optical system 40 included in the lens 10. Hereinafter, the "focus position of the entire optical system 40 included in the lens 10" is sometimes described as the "focus position of the lens 10" or simply as the "focus position" in the present specification. The focus group 41 includes a set of one or more single lenses. The focus group 41 is used in combination with a drive system that moves at least a part of the set along the optical axis OA. In the embodiment, the drive system includes a rail extending along the optical axis OA, a motor that moves the one or more single lenses along the rail, and a sensor that detects a position of the one or more single lenses on the rail and transmits the position to the processor 32. In the lens system 100, the focus position of the lens 10 is changed by driving the motor. In the present specification, "focus control" is intended to include at least changing the focus position.

The zoom group 42 is the optical element configured to change an angle of view (that is, a zoom magnification) of the entire optical system 40 included in the lens 10. Hereinafter, the "angle of view of the entire optical system 40 included in the lens 10" is sometimes described as the "zoom magnification of the lens 10" or simply as the "zoom magnification" in the present specification. The zoom group 42 includes a set of two or more single lenses. The zoom group 42 is used in combination with a drive system that moves a part of the set along the optical axis OA. In the embodiment, the drive system includes a rail extending along the optical axis OA, a motor that moves the one or more single lenses along the rail, and a sensor that detects a position of the one or more single lenses on the rail and transmits the position to the processor 32. In the lens system 100, the zoom magnification of the lens 10 is changed by driving the motor. In the present specification, "zoom control" is intended to include at least changing the zoom magnification.

The diaphragm 43 is the optical element that defines a light flux diameter of the entire optical system 40 included in the lens 10, thereby changing an aperture value of the entire optical system 40. Hereinafter, the "aperture value of the entire optical system 40 included in the lens 10" is sometimes described as the "aperture value of the lens 10" or simply as the "aperture value" in the present specification. The diaphragm 43 has diaphragm blades arranged in a ring shape on a plane perpendicular to the optical axis OA. The diaphragm 43 is used in combination with a motor that opens and closes the diaphragm blades, and a sensor that detects the degree of opening and closing of the diaphragm blades and transmits the degree to the processor 32. In the lens system 100, the aperture value of the lens 10 is changed by driving the motor. In the present specification, "aperture control" is intended to include at least changing the aperture value.

Hereinafter, the setting of the optical element included in the optical system 40 is sometimes referred to as the "control state of the lens system 100" or simply as the "control state" in the present specification.

Note that the optical system 40 is not limited to the above-described configuration including the focus group 41, the Zoom group 42, and the diaphragm 43. It is sufficient that the optical system 40 includes at least one of the focus group 41, the zoom group 42, and the diaphragm 43 in the invention.

In addition, each of the focus group 41, the zoom group 42, and the diaphragm 43 is not limited to the above-described configuration in the invention. It is sufficient that each of the focus group 41, the zoom group 42, and the diaphragm 43 has a configuration capable of changing each of the focus position, the zoom magnification, and the aperture value of the optical system 40 and a configuration capable of transmitting the current setting to the processor 32 of the controller 30.

In the invention, the lens 10 is not limited to the zoom lens having the above-described configuration. It is sufficient that the lens 10 is configured such that at least one out of the group of optical elements can be driven. In addition, the lens 10 may be detachably mounted on the camera or may be integrally mounted on the camera not to be detachable from the camera in the invention. Examples of the lens 10 detachably mounted on the camera include the zoom lens and a single focus lens. Examples of the camera in which the lens 10 is integrally mounted on the camera include a compact digital camera, a video camera, a surveillance camera, a far-infrared camera, a microscope camera, and the like.

(Control Process of Lens)

Figure 2:
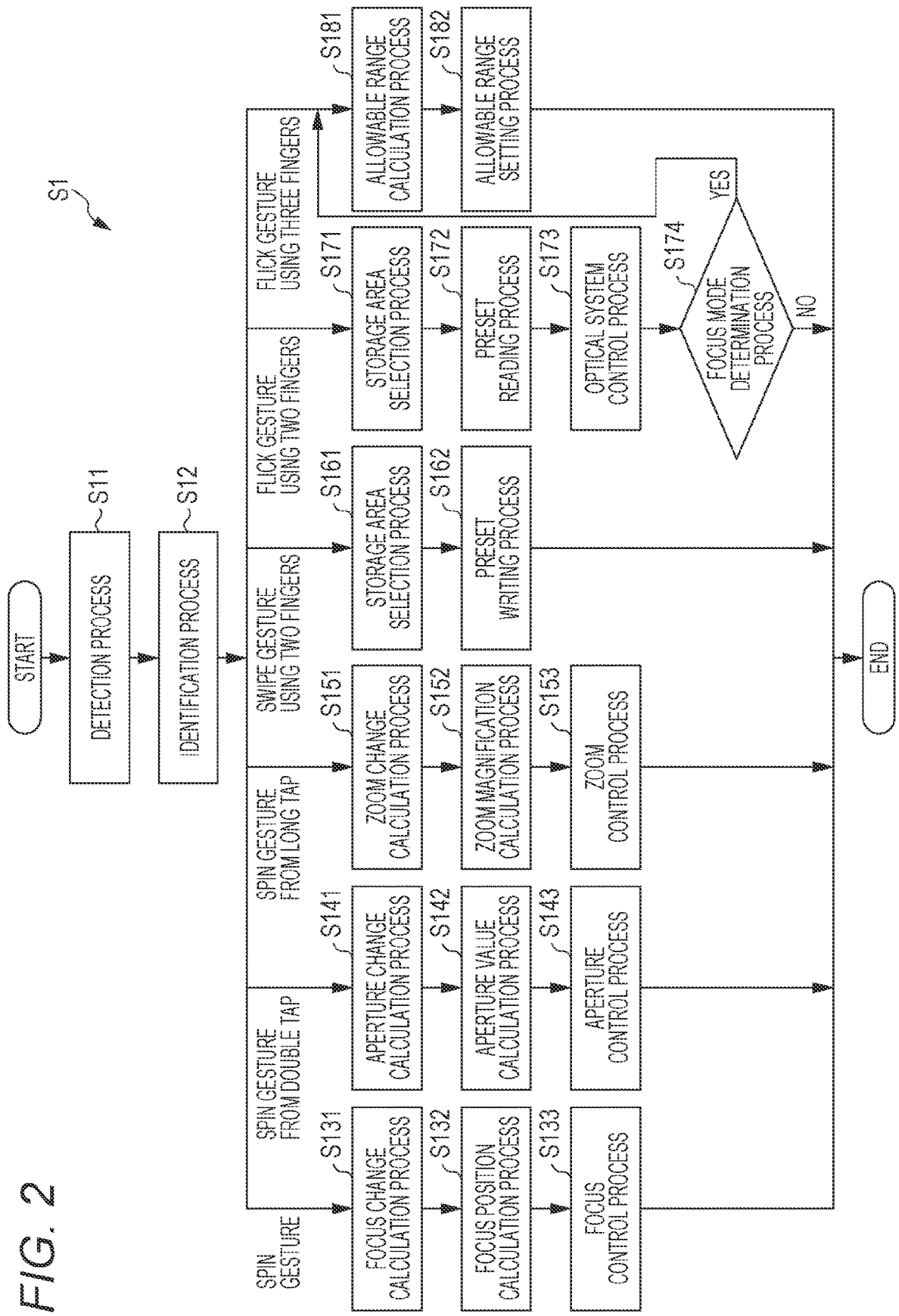
FIG. 2 is a flowchart illustrating a flow of a control method executed by an operation terminal illustrated in FIG. 1 and a controller included in a lens.

The control process S1 of the lens 10 will be described with reference to FIG. 2. FIG. 2 is a flowchart illustrating a flow of a control method executed by the operation terminal 20 illustrated in FIG. 1 and the controller 30 included in the lens 10. The control process S1 is a process of controlling the lens 10 in order to suitably obtain an image of a subject.

As illustrated in FIG. 2, the control process S1 includes a detection process S11, an identification process S12, a focus change calculation process S131, an aperture change calculation process S141, a zoom change calculation process S151, a storage area selection process S161, and a storage area selection process S171. In the embodiment, these processes are executed by the processor 22 of the operation terminal 20 as a processing subject.

As illustrated in FIG. 2, the control process S1 further includes a focus position calculation process S132, a focus control process S133, an aperture value calculation process S142, an aperture control process S143, a zoom magnification calculation process S152, a zoom control process S153, a preset writing process S162, a preset reading process S172, an optical system control process S173, a focus mode determination process S174, an allowable range calculation process S181, and an allowable range setting process S182. In the embodiment, these processes are executed by the processor 32 of the controller 30 as a processing subject.

In each of the processes included in the control process S1, the processor 22 displays a graphic user interface (GUI) corresponding to an input gesture command and the process to be executed on the display of the touch panel 21. The gesture command and the screen to be displayed will be described later with reference to another drawing.

(Detection Process)

The detection process S11 is a process of detecting a touch position on the touch panel 21. When the user touches the touch panel 21, the processor 22 detects the touch position. A method by which the user inputs the gesture command in the detection process S11 will be described later with reference to another drawing.

(Identification Process)

The identification process S12 is a process of identifying a gesture command associated with to a trajectory of the touch position detected in the detection process S11. The trajectory of the touch position to be referred to includes a movement direction and a movement amount of the touch position, and information on the number of touch positions corresponding to the number of fingers. Gesture commands that can be identified in the identification process S12 are as follows.

(1) Spin gesture
(2) Spin gesture from double tap
(3) Spin gesture from long tap
(4) Swipe gesture using two fingers
(5) Flick gesture using two fingers
(6) Flick gesture using three fingers In the embodiment, a spin gesture in (1) refers to a gesture command whose trajectory is substantially circular. Specific examples of the substantially circular trajectory include trajectories of a perfect circle, an ellipse, and a spiral, and combinations and similar trajectories thereof. Note that the substantially circular trajectory includes a trajectory in which a touch position moves clockwise and a trajectory in which a touch position moves counterclockwise. The clockwise trajectory and the counterclockwise trajectory are distinguished from each other by using the rotation direction thereof as a criterion.

In the embodiment, a spin gesture from a double tap in (2) refers to a gesture command with the double tap immediately before the above-described spin gesture. More specifically, the spin gesture from the double tap is a gesture command input in the order of a first touch, detachment, a second touch, and a spin gesture without detachment from the second touch. In the embodiment, a time interval between the first touch and the second touch is defined depending on an operating system (OS) on which the smartphone that is the operation terminal 20 operates.

In the embodiment, a spin gesture from a long tap in (3) refers to a gesture command with a long tap immediately before the above-described spin gesture. More specifically, the spin gesture from the long tap is a gesture command input in the order of a touch, a long press without moving a touch position from the immediately previous touch, and a spin gesture without detachment from the immediately previous long press. In the embodiment, a period of time of the long press is defined depending on the OS on which the smartphone as the operation terminal 20 operates.

Note that the spin gesture in (1) is distinguished from the spin gesture from the double tap in (2) and the spin gesture from the long tap in (3) in terms of involving neither the double tap nor the long tap immediately before the spin gesture.

In the embodiment, a swipe gesture using two fingers in (4) refers to a gesture command having a trajectory in which two touch positions exist and the two touch positions move to slide linearly.

In the embodiment, a flick gesture using two fingers in (5) refers to a gesture command having a trajectory in which two touch positions exist and the two touch positions move to flick linearly.

Note that the swipe gesture using two fingers in (4) and the flick gesture using two fingers in (5) are distinguished from each other by using, as a criterion, the duration in which a touched state is maintained after movement of the two touch positions.

In the embodiment, a flick gesture using three fingers in (6) refers to a gesture command having a trajectory in which three touch positions exist and the three touch positions move to flick linearly.

Each of the swipe gesture using two fingers in (4), the flick gesture using two fingers in (5), and the flick gesture using three fingers in (6) is further classified by using a swipe direction or a flick direction as a criterion. In the embodiment, for example, the swipe gesture using two fingers in (4) is further classified into a leftward, upward, rightward, or downward swipe gesture by using the swipe direction as the criterion.

Each of the criteria defined by the OS described above may be defined by the control processing program P20 stored in the memory of the operation terminal 20 instead of the OS. In addition, each of the criteria may be customizable by the user through the control processing program P20.

(Focus Change Calculation Process)

In a case where the spin gesture in (1) has been identified in the identification process S12, the processor 22 executes the focus change calculation process S131. The focus change calculation process S131 is a process of calculating a change amount of the focus position of the lens 10. The processor 22 calculates the change amount of the focus position from a current focus position with reference to the rotation direction of the spin gesture and a movement amount of the touch position (that is, a length of the trajectory). Here, the change amount includes a movement direction and a movement amount.

When the clockwise and counterclockwise spin gestures are input by the user in the embodiment, the processor 22 determines the movement direction of the focus position as an infinity direction (INF direction) and a near direction (MOD direction), respectively. In addition, the processor 22 calculates a larger value as the movement amount of the focus position as the movement amount of the touch position increases.

The processor 22 of the operation terminal 20 transmits a calculation result of the change amount of the focus position to the processor 32 of the controller 30.

(Focus Position Calculation Process)

The focus position calculation process S132 is a process of calculating a target focus position of lens 10. The processor 32 of the controller 30 refers to the calculation result of the change amount of the focus position received from the processor 22 of the operation terminal 20 and the position of the one or more single lenses on the rail received from the sensor of the focus group 41. Specifically, the processor 32 adds the calculation result of the change amount of the focus position to the current focus position corresponding to the position of one or more single lenses received from the sensor to calculate the target focus position.

(Focus Control Process)

The focus control process S133 is a process of changing the focus position of the lens 10. The processor 32 drives the motor of the focus group 41 to change the focus position to the target focus position. In this manner, the focus position of the lens 10 is controlled by the controller 30 in accordance with the spin gesture.

(Aperture Change Calculation Process)

In a case where the spin gesture from the double tap in (2) has been identified in the identification process S12, the processor 22 executes the aperture change calculation process S141. The aperture change calculation process S141 is a process of calculating a change amount of the aperture value of the lens 10. When the clockwise spin gesture from the double tap and the counterclockwise spin gesture from the double tap are input by the user in the embodiment, the processor 22 determines the change in the aperture value as a closing direction (Close direction) and an opening direction (Open direction), respectively. The processing executed by the processor 22 is similar to the processing in the focus change calculation process S131 except that the change amount of the aperture value is calculated instead of the change amount of the focus position, and thus, the description thereof will be omitted.

The processor 22 of the operation terminal 20 transmits a calculation result of the change amount of the aperture value to the processor 32 of the controller 30.

(Aperture Value Calculation Process)

The aperture value calculation process S142 is a process of calculating a target aperture value of the lens 10. The processing executed by the processor 32 is similar to the processing in the focus position calculation process S132 except that the target aperture value is calculated instead of the target focus position, and thus, the description thereof will be omitted.

(Aperture Control Process)

The aperture control process S143 is a process of changing the aperture value of lens 10. The processor 32 drives the motor of the diaphragm 43 to change the aperture value to the target aperture value. In this manner, the aperture value of the lens 10 is controlled by the controller 30 in accordance with the spin gesture.

(Zoom Change Calculation Process)

In a case where the spin gesture from the long tap in (3) has been identified in the identification process S12, the processor 22 executes the zoom change calculation process S151. The zoom change calculation process S151 is a process of calculating a change amount of the zoom magnification of the lens 10. In the embodiment, when the clockwise gesture from the long tap and the counterclockwise spin gesture from the long tap are input by the user, the processor 22 determines the change in the zoom magnification as a telephoto side (Tele direction) and a wide-angle side (Wide direction), respectively. The processing executed by the processor 22 is similar to the processing in the focus change calculation process S131 except that the change amount of the zoom magnification is calculated instead of the change amount of the focus position, and thus, the description thereof will be omitted.

The processor 22 of the operation terminal 20 transmits a calculation result of the change amount of the zoom magnification to the processor 32 of the controller 30.

(Zoom Magnification Calculation Process)

The zoom magnification calculation process S152 is a process of calculating a target zoom magnification of the lens 10. The processing executed by the processor 32 is similar to the processing in the focus position calculation process S132 except that the target zoom magnification is calculated instead of the target focus position, and thus, the description thereof will be omitted.

(Zoom Control Process)

The zoom control process S153 is a process of changing the zoom magnification of the lens 10. The processor 32 drives the motor of the zoom group 42 to change the zoom magnification to the target zoom magnification. In this manner, the zoom magnification of the lens 10 is controlled by the controller 30 in accordance with the spin gesture.

(Selection of Focus Control Process, Aperture Control Process, and Zoom Control Process)

The focus control process S133, the aperture control process S143, and the zoom control process S153 described above are all executed in accordance with the spin gesture of the user. That is, the controller 30 executes the focus control process S133, the aperture control process S143, or the zoom control process S153 of the lens 10 in accordance with the spin gesture.

Note that which control process among the focus control process S133, the aperture control process S143, and the zoom control process S153 is to be executed by the controller 30 is determined in accordance with the presence/absence or a type of a gesture command input immediately before the spin gesture. Specifically, in a case where the spin gesture does not accompany any of the double tap and the long tap immediately before the spin gesture, the processor 32 executes the focus control process S133. In a case where the spin gesture accompanies the immediately previous double tap, the processor 32 executes the aperture control process S143. In a case where the spin gesture accompanies the immediately previous long tap, the processor 32 executes the zoom control process S153.

Note that the processor 22 executes the detection process S11, the identification process S12, and the subsequent processes not after the user completes the operation including the spin gesture and detaches the hand but from a point in time when the user first touches the screen.

Specifically, in each of the detection process S11 and the identification process S12, the processor 22 detects and identifies the double tap or the long tap separately, that is, before the spin gesture is input. At a point in time when the double tap or the long tap has been identified, the processor 22 selects the aperture value or the zoom magnification as a target for calculating a change amount in the subsequent process. Next, when the spin gesture input immediately after the double tap or the long tap is identified, the processor 22 executes the aperture change calculation process S141 or the zoom change calculation process S151 in accordance with the selected target. When the spin gesture that does not accompany the double tap and the long tap is identified, the processor 22 executes the focus change calculation process S131.

In the subsequent focus change calculation process S131, aperture change calculation process S141, or zoom change calculation process S151, the processor 22 calculates a change amount every certain period of time on the basis of the rotation direction of the spin gesture and a movement amount of the touch position. For example, when a movement amount within a certain period of time (for example, 0.01 seconds, 0.05 seconds, or 0.1 seconds) is large, the processor 22 calculates a large value as the change amount and transmits the calculation result to the processor 32 every certain period of time. Therefore, the focus position, the aperture value, or the zoom magnification changes more rapidly as the user moves the touch position faster. Here, the spin gesture input by the user has the substantially circular trajectory as a whole, but a trajectory input within a certain period of time, that is, a part of the spin gesture may be a linear trajectory.

(Storage Area Selection Process)

In a case where the swipe gesture using two fingers in (4) has been identified in the identification process S12, the processor 22 executes the storage area selection process S161. The storage area selection process S161 is a process of determining a storage area into which preset information is to be written in accordance with the swipe direction.

In the present specification, the preset information refers to information in which at least one parameter of the control state of the lens system 100 and a value of the parameter are associated with each other. In the embodiment, the preset information is written and read in the form of electronic data. As a specific example, "writing a current aperture value of the lens 10 into the memory as the preset information" refers to storing preset information, which is electronic data including (X) information indicating that the preset information includes the aperture value as the parameter and (Y) information (for example, "F 2.8") indicating the value of the parameter, in any one of the storage areas 311, 312, 313, and 314 of the memory 31.

The processor 22 selects any one of the storage areas 311, 312, 313, and 314 of the memory 31 with reference to the swipe direction by using a predetermined correspondence as a criterion. In the embodiment, predetermined correspondences of (leftward and the storage area 311), (upward and the storage area 312), (rightward and the storage area 313), and (downward and the storage area 314) are defined by the control processing program P20. For example, when the user inputs the rightward swipe gesture, the processor 22 selects the storage area 313 as the storage area into which the preset information is to be written.

The processor 22 of the operation terminal 20 transmits the storage area selection result to the processor 32 of the controller 30.

(Preset Writing Process)

The preset writing process S162 is a process of writing a current focus position, a current aperture value, or a current zoom magnification of the lens 10 as preset information into the memory in accordance with the swipe gesture.

In the embodiment, which one of the focus position, the aperture value, and the zoom magnification is to be stored as the preset information in each of the four storage areas 311, 312, 313, and 314 is defined by the control processing program P10. In the embodiment, correspondences of (the storage area 311 and the zoom magnification), (the storage area 312 and the aperture value), (the storage area 313 and the focus position), and (the storage area 314, the zoom magnification, and the aperture) are defined. Note that the invention is not limited to these correspondences.

The processor 32 acquires a current value of the parameter corresponding to the storage area selected in the storage area selection process S161 from at least one corresponding sensor among the sensor of the focus group 41, the sensor of the zoom group 42, and the sensor of the diaphragm 43. Next, the processor 32 writes the acquired value of the parameter into the selected storage area.

For example, when the storage area 313 has been selected in the storage area selection process S161, the processor 32 acquires a value of the focus position from the sensor of the focus group 41 and writes the acquired value into the storage area 313.

(Storage Area Selection Process)

In a case where the flick gesture using two fingers in (5) has been identified in the identification process S12, the processor 22 executes the storage area selection process S171. The storage area selection process S171 is a process of determining a storage area from which the preset information is to be read in accordance with the flick direction.

The processor 22 of the operation terminal 20 selects any one of the storage areas 311, 312, 313, and 314 of the memory 31 with reference to the swipe direction by using a predetermined correspondence as a criterion. In the embodiment, the predetermined correspondences are the same as the correspondences in the storage area selection process S161 described above. For example, when the user inputs the rightward flick gesture, the processor 22 selects the storage area 313 as the storage area from which the preset information is to be read.

The processor 22 of the operation terminal 20 transmits the storage area selection result to the processor 32 of the controller 30.

(Preset Reading Process)

The preset reading process S172 is a process of reading the focus position, the aperture value, or the zoom magnification of the lens 10 stored as the preset information from the storage area 311, 312, 313, or 314. The processor 32 reads the preset information from one storage area selected in the storage area selection process S171. For example, when the storage area 313 has been selected in the storage area selection process S171, the processor 32 reads the focus position stored in the storage area 313 as the preset information.

(Optical System Control Process)

The optical system control process S173 is a process of setting the focus position, the aperture value, or the zoom magnification of the lens 10 in accordance with the flick gesture on the basis of the focus position, the aperture value, or the zoom magnification read from the memory 31 as the preset information.

The processor 32 drives the corresponding optical element included in the optical system 40 such that the current value of the parameter coincides with the value of the focus position, the aperture value, or the zoom magnification included in the preset information read in the preset reading process S172. As a result, the processor 32 sets the focus position, the aperture value, or the zoom magnification. For example, when the focus position has been read as the preset information in the preset reading process S172, the processor 32 drives the motor of the focus group 41, thereby setting the current focus position such that a value of the current focus position coincides with the value of the focus position read from the storage area 313.

(Focus Mode Determination Process)

The focus mode determination process S174 is a process of determining the focus mode of the lens 10. In a case where the focus position has been set in the optical system control process S173 and the focus mode of the lens 10 is an autofocus (AF) mode (in the case of "YES" in the focus mode determination process S174), the processor 32 further executes the allowable range calculation process S181. The allowable range calculation process S181 will be described later. In a case where the focus position has not been set in the optical system control process S173 and in a case where the focus mode of the lens 10 is a manual focus (MF) mode (in the case of "NO" in the focus mode determination process S174), the processor 32 ends the control process S1.

(Allowable Range Calculation Process)

In a case where the flick gesture using three fingers in (6) has been identified in the identification process S12, the processor 22 transmits the specifying result to the processor 32, and the processor 32 executes the allowable range calculation process S181. In addition, the processor 32 also executes the allowable range calculation process S181 in the case of "YES" in the focus mode determination process S174. The allowable range calculation process S181 is a process of calculating an allowable range of the focus position of the lens 10 in the autofocus mode on the basis of the current focus position of the lens 10.

When the focus mode determination process S174 has not been executed before the allowable range calculation process S181, the processor 32 reads an allowable change amount of the focus position from the memory 31 with reference to the flick direction of the flick gesture using three fingers in (6). In this case, the allowable change amount of the focus position is defined by the control processing program P10 in association with the flick direction.

When the focus mode determination process S174 has been executed before the allowable range calculation process S181, the processor 32 reads the allowable change amount of the focus position from the memory 31. In this case, the allowable change amount of the focus position is defined by the control processing program P10 in association with the presence of the focus mode determination process S174.

Here, the allowable change amount of the focus position refers to a range in which the focus position can be moved in the autofocus mode with any focus position as a reference. As a specific example of the allowable change amount of the focus position, a range between 5 m forward and 5 m backward, that is, a range from 5 m in the near direction to 5 m in the infinity direction may be defined by the control processing program P10 with any focus position as a reference. As another specific example, with any focus position as a reference, a range not including the reference focus position, for example, a range from 10 m in the infinity direction to 20 m in the infinity direction may be defined by the control processing program P10. The allowable change amount of the focus position can be customized by the user through the control processing program P10.

Next, the processor 32 adds the read allowable change amount of the focus position to the current focus position to calculate an allowable range of the focus position. As a specific example of the allowable range of the focus position, in a case where the current focus position is a position 10 m away from the lens 10 and the read allowable change amount of the focus position is the range from 5 m in the near direction to 5 m in the infinity direction, the allowable range of the focus position is calculated as a range from 5 m to 15 m from the lens 10.

(Allowable Range Setting Process)

The allowable range setting process S182 is a process of setting the allowable range of the focus position of the lens 10 in the autofocus mode on the basis of the current focus position of the lens 10 in accordance with the flick gesture and the number of fingers performing the flick gesture. This is a process of changing or maintaining a mode of the focus group 41 to or in the autofocus mode, and setting an allowable range of the focus position of the lens 10 in the autofocus mode to the allowable range of the focus position calculated in the allowable range calculation process S181.

(Method for Inputting Gesture Command)

Figure 3:
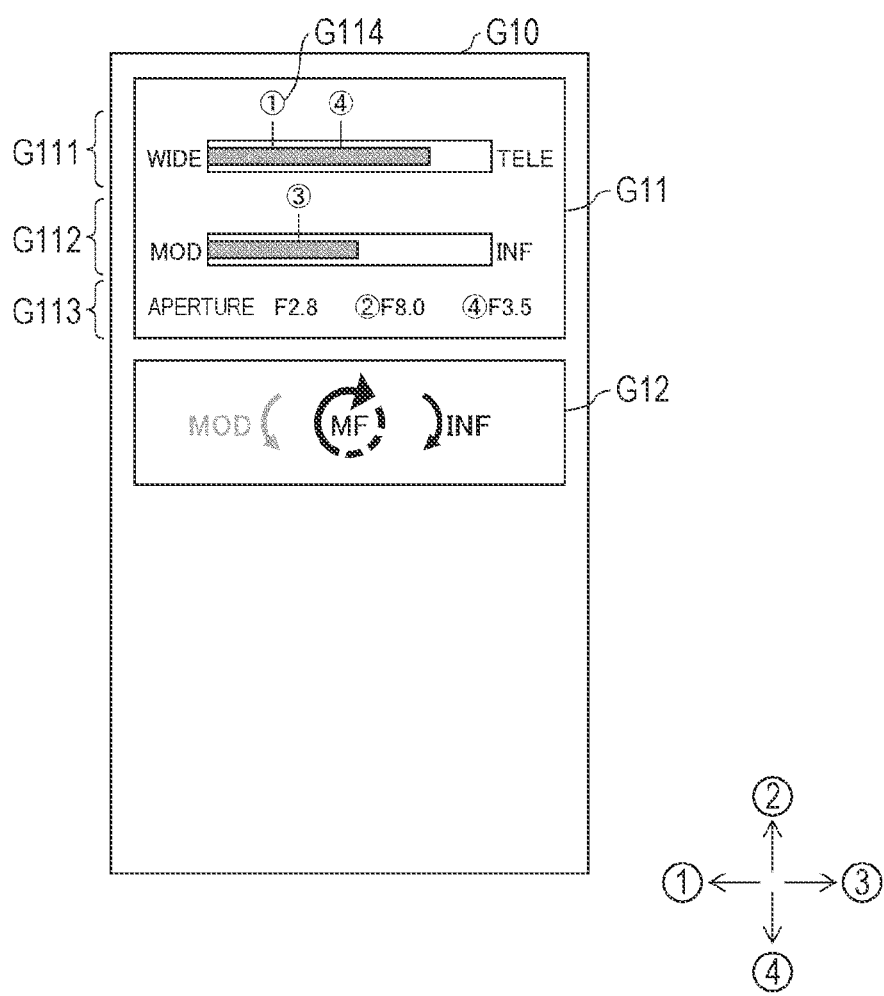
FIG. 3 is a view illustrating a specific example of a screen displayed on a touch panel included in the operation terminal illustrated in FIG. 1.

A method for inputting the gesture command will be described with reference to FIG. 3. FIG. 3 is a view illustrating a specific example of a screen displayed on the touch panel 21 included in the operation terminal 20 illustrated in FIG. 1. A screen G10 illustrated in FIG. 3 is the screen displayed on the display of the touch panel 21. A GUI on the screen G10 is controlled by the processor 22 of the operation terminal 20 as a processing subject. As illustrated in FIG. 3, the screen G10 includes a control state display section G11 and a feedback display section G12.

The control state display section G11 is a GUI group illustrating the control state of the lens system 100 to the user. Each GUI included in the control state display section G11 is displayed by the processor 22 on the basis of information acquired by the processor 32 of the controller 30 from the sensors included in the optical system 40 or the memory 31 and transmitted to the processor 22 of the operation terminal 20. As illustrated in FIG. 3, the control state display section G11 includes a zoom magnification display section G111, a focus position display section G112, an aperture value display section G113, and a preset display section G114.

The zoom magnification display section G111 is a GUI illustrating a current zoom magnification of the lens 10 to the user. In the zoom magnification display section G111, a bar extending in the lateral direction illustrates the current zoom magnification in a meter format. In the embodiment, the bar illustrates that the zoom magnification is higher as the bar extends longer rightward. In addition, the bar illustrates that the zoom magnification is lower as the bar is shorter.

The focus position display section G112 is a GUI illustrating a current focus position of the lens 10 to the user. In the focus position display section G112, a bar extending in the lateral direction illustrates the current focus position in a meter format. In the embodiment, the bar illustrates that the focus position is located in the infinity direction as the bar extends longer rightward. In addition, the bar illustrates that the focus position is in the near direction as the bar is shorter.

The aperture value display section G113 is a GUI illustrating a current aperture value of the lens 10 to the user. In the aperture value display section G113, the current aperture value is illustrated in a numerical format. For example, in FIG. 3, "F 2.8" in the aperture value display section G113 illustrates that the current aperture value (F value) is 2.8.

The preset display section G114 is a GUI illustrating the preset information stored in the storage areas 311, 312, 313, and 314 to the user. In FIG. 3, circled numbers "1", "2", "3", and "4" mean the preset information stored in the storage areas 311, 312, 313, and 314, respectively. For example, two circled "4" in FIG. 3 means that the storage area 314 stores a zoom magnification corresponding to a length in the bar of the zoom magnification display section G111 and an aperture value of 3.5 as the preset information.

Note that arrows and circled numbers on the lower right side are illustrated in FIG. 3 to illustrate correspondences between each of the swipe direction and the flick direction with respect to the screen G10 and each of the circled numbers of the preset display section G114 for understanding of the embodiment of the invention.

The feedback display section G12 is a GUI configured to feed back the gesture command input by the user to the user. The feedback display section G12 can be displayed by the processor 22 on the basis of the gesture command detected and identified by the processor 22. As a specific example, FIG. 3 illustrates a GUI displayed when the user inputs the spin gesture to the touch panel 21 and the processor 22 executes the focus change calculation process S131 in accordance with the spin gesture. In FIG. 3, the feedback display section G12 illustrates to the user that the focus control is being performed in the lens system 100 by a circular arrow at the center. In addition, in FIG. 3, the feedback display section G12 illustrates an operation method to the user by arrows on both sides. In the feedback display section G12, the clockwise arrow displayed on the right side illustrates to the user that the clockwise spin gesture corresponds to movement of the focus position in the infinity direction (INF direction). Conversely, the counterclockwise arrow displayed on the left side illustrates to the user that the counterclockwise spin gesture corresponds to movement of the focus position in the near direction (MOD direction).

In the embodiment, the user touches any position in the screen G10 to perform input. It is sufficient that a touch position first touched by the user is within an area of the screen G10, and the touch position may be, for example, within an area of the control state display section G11 or the feedback display section G12, or may be in other areas.
(Method for Inputting Spin Gesture)

Figure 4:
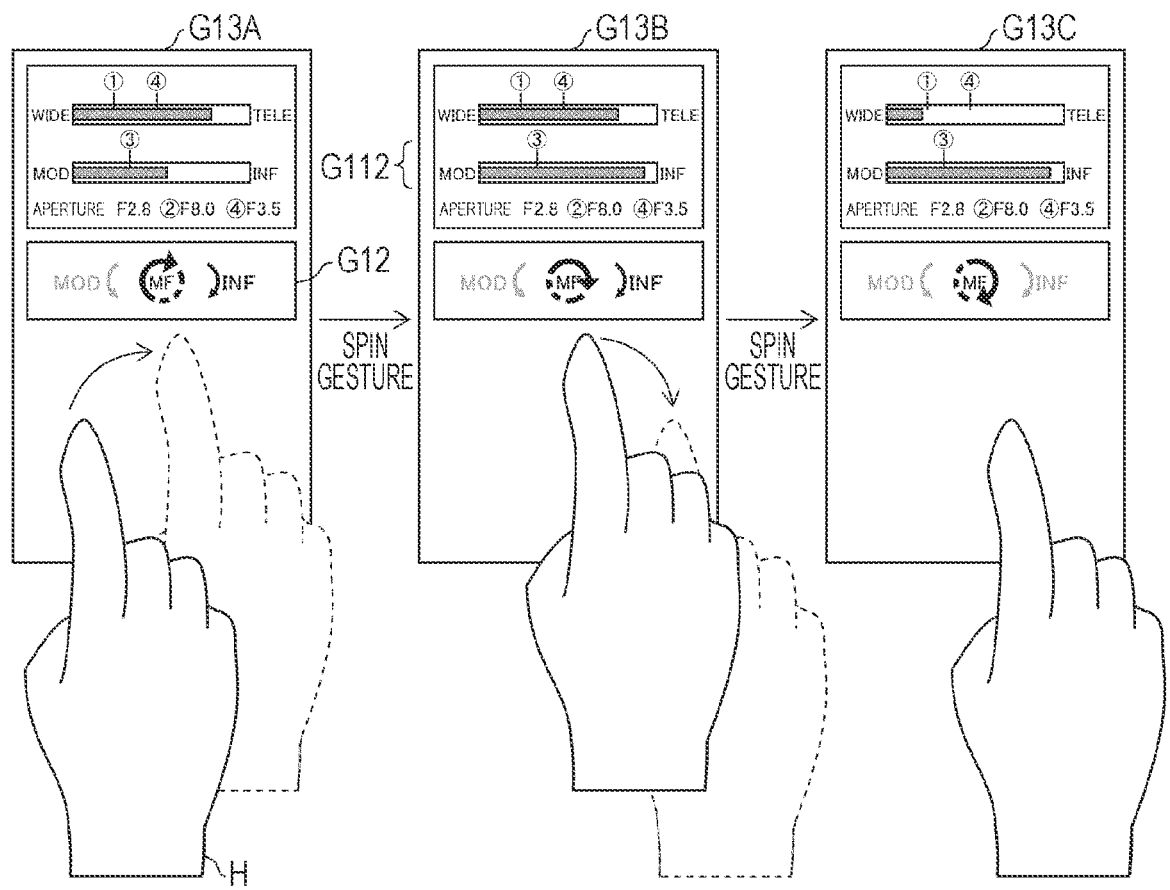
FIG. 4 is a view illustrating specific examples of a gesture command input to the touch panel and transition of a screen displayed on the touch panel for focus control in the operation terminal illustrated in FIG. 1.

A method for inputting the spin gesture will be described with reference to FIG. 4. Note that the spin gesture is associated with focus control in the embodiment. FIG. 4 is a view illustrating specific examples of a gesture command input to the touch panel 21 and transition of a screen displayed on the touch panel 21 for the focus control in the operation terminal 20 illustrated in FIG. 1. Screens G13A, G13B, and G13C illustrated in FIG. 4 are screens displayed on the display of the touch panel 21 to transition in this order while the detection process S11, the identification process S12, the focus change calculation process S131, the focus position calculation process S132, and the focus control process S133 described above are being executed. A hand H illustrated in FIG. 4 is a hand of the user who inputs the gesture command.

In FIG. 4, each of the screens G13A, G13B, and G13C is a screen displayed immediately after the gesture command of the hand H illustrated together with the screen has been input. For example, the screen G13A is a screen displayed after the clockwise spin gesture is input, and the screen G13C is a screen displayed after the spin gesture stops. In addition, FIG. 5 to 8 also illustrate gesture commands and screens in similar relationships.

On the screen G13A, the user touches any area of the screen G13A, and then, slides the touch position in the clockwise direction on a substantially circular orbit, thereby inputting the clockwise spin gesture. The processor 22 displays GUIs (a circular arrow at the center and a black arrow on the right side) illustrating that the movement of the focus position in the infinity direction (INF direction) is being executed in accordance with the clockwise spin gesture as the feedback display section G12. In the embodiment, any GUI as the feedback display section G12 has not been displayed until this GUI is displayed although the illustration is omitted.

On the screen G13B, the user continues to input the clockwise spin gesture. The processor 22 changes the display of the focus position display section G112, and displays, as the focus position display section G112, a GUI illustrating that the focus position has moved in the infinity direction (INF direction).

The user stops the spin gesture when confirming that the focus position has moved to a desired focus position by viewing the display of the focus position display section G112 on the screen G13C. The processor 22 changes the feedback display section G12 to display the GUI (the circular arrow at the center) illustrating that the focus control is in the standby state and GUIs (gray arrows on both sides) illustrating an operation method in the focus control.

In the embodiment, the processor 22 stops the display of the feedback display section G12 when the user releases, that is, detaches the hand H from the screen although illustration is omitted. As a result, nothing is displayed as a GUI of the feedback display section G12.

Although only the clockwise spin gesture is illustrated in FIG. 4, the user may input a combination of the clockwise spin gesture and the counterclockwise spin gesture at any point in time. For example, the user may start to input the counterclockwise spin gesture after stopping the spin gesture on the screen G13C. In this case, the processor 22 moves the focus position in the near direction (MOD direction) in accordance with the counterclockwise spin gesture.

(Method for Inputting Spin Gesture from Double Tap)

Figure 5:
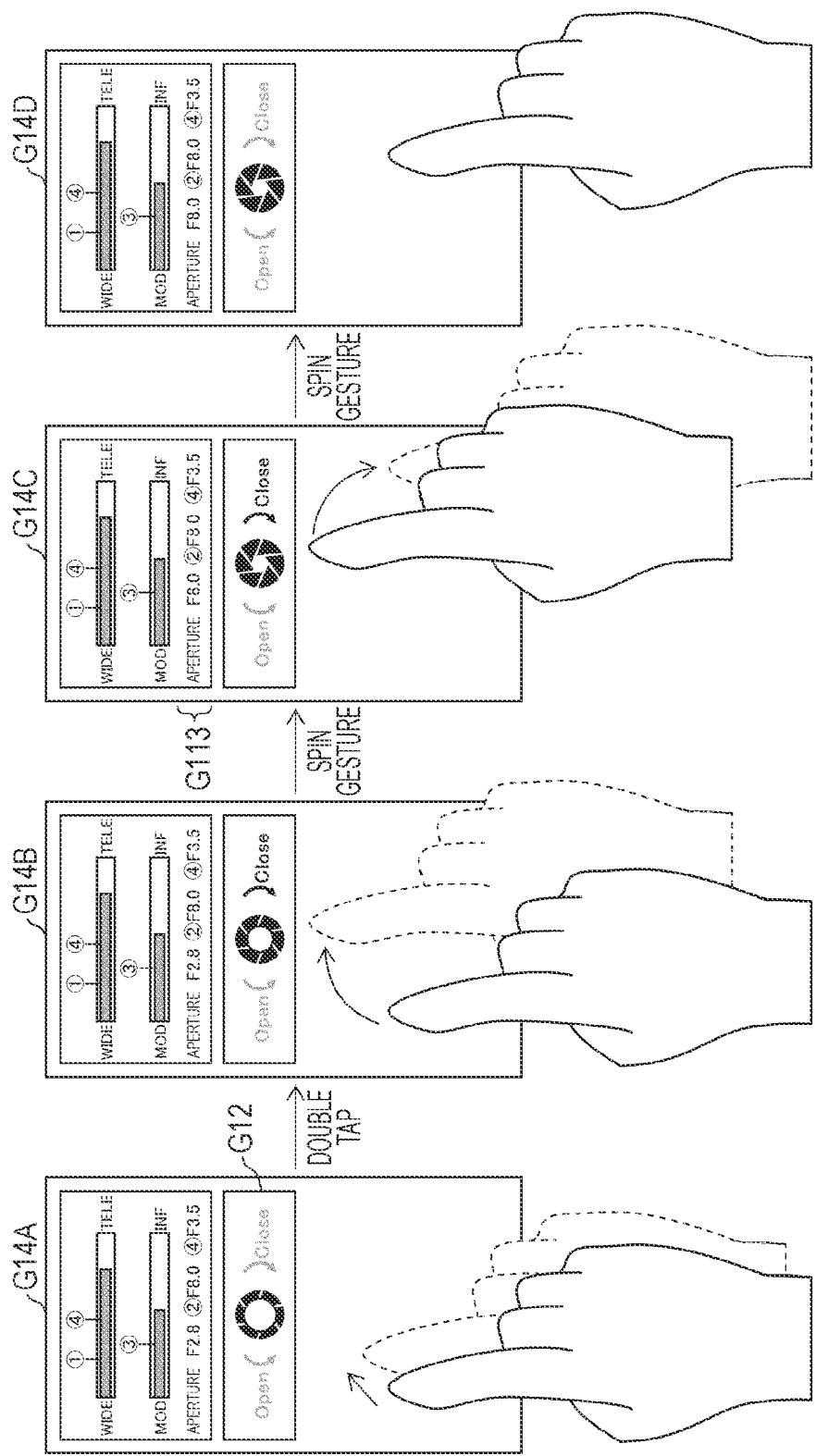
FIG. 5 is a view illustrating specific examples of a gesture command input to the touch panel and transition of a screen displayed on the touch panel for aperture control in the operation terminal illustrated in FIG. 1.

A method for inputting the spin gesture from the double tap will be described with reference to FIG. 5. In the embodiment, the spin gesture from the double tap is associated with aperture control. FIG. 5 is a view illustrating specific examples of a gesture command input to the touch panel 21 and transition of a screen displayed on the touch panel 21 for the aperture control in the operation terminal 20 illustrated in FIG. 1. Screens G14A, G14B, G14C, and G14D illustrated in FIG. 5 are screens displayed on the display of the touch panel 21 to transition in this order while the detection process S11, the identification process 312, the aperture change calculation process S141, the aperture value calculation process S142, and the aperture control process S143 described above are being executed.

On the screen G14A, the user double-taps any area of the screen G14A. The processor 22 displays a GUI (a ring imitating the diaphragm blades) illustrating that the aperture control is in the standby state and GUIs (gray arrows on both sides) illustrating an operation method in the aperture control.

On the screen G14B, the user slides the touch position in the clockwise direction on the substantially circular orbit, thereby inputting the clockwise spin gesture. The processor 22 displays a GUI (a clockwise black arrow on the right side) illustrating that the driving of the diaphragm in the closing direction (Close direction) is being executed as the feedback display section G12.

On the screen G14C, the user continues to input the clockwise spin gesture. The processor 22 changes the display of the aperture value display section G113, and displays a GUI illustrating that the driving of the diaphragm in the closing direction (Close direction) has been executed as the aperture value display section G113. In FIG. 5, the processor 22 changes the display of the aperture value display section G113 from "F 2.8" on the screen G14B to "F 8.0" on the screen G14C.

The user stops the spin gesture when confirming that the aperture value has changed to a desired aperture value by viewing the display of the aperture value display section G113 on the screen G14D. The processor 22 changes the feedback display section G12 to display the GUI (the ring imitating the diaphragm blades) illustrating that the aperture control is in the standby state and the GUIs (the gray arrows on both sides) illustrating the operation method in the aperture control.

(Method for Inputting Spin Gesture from Long Tap)

Figure 6:
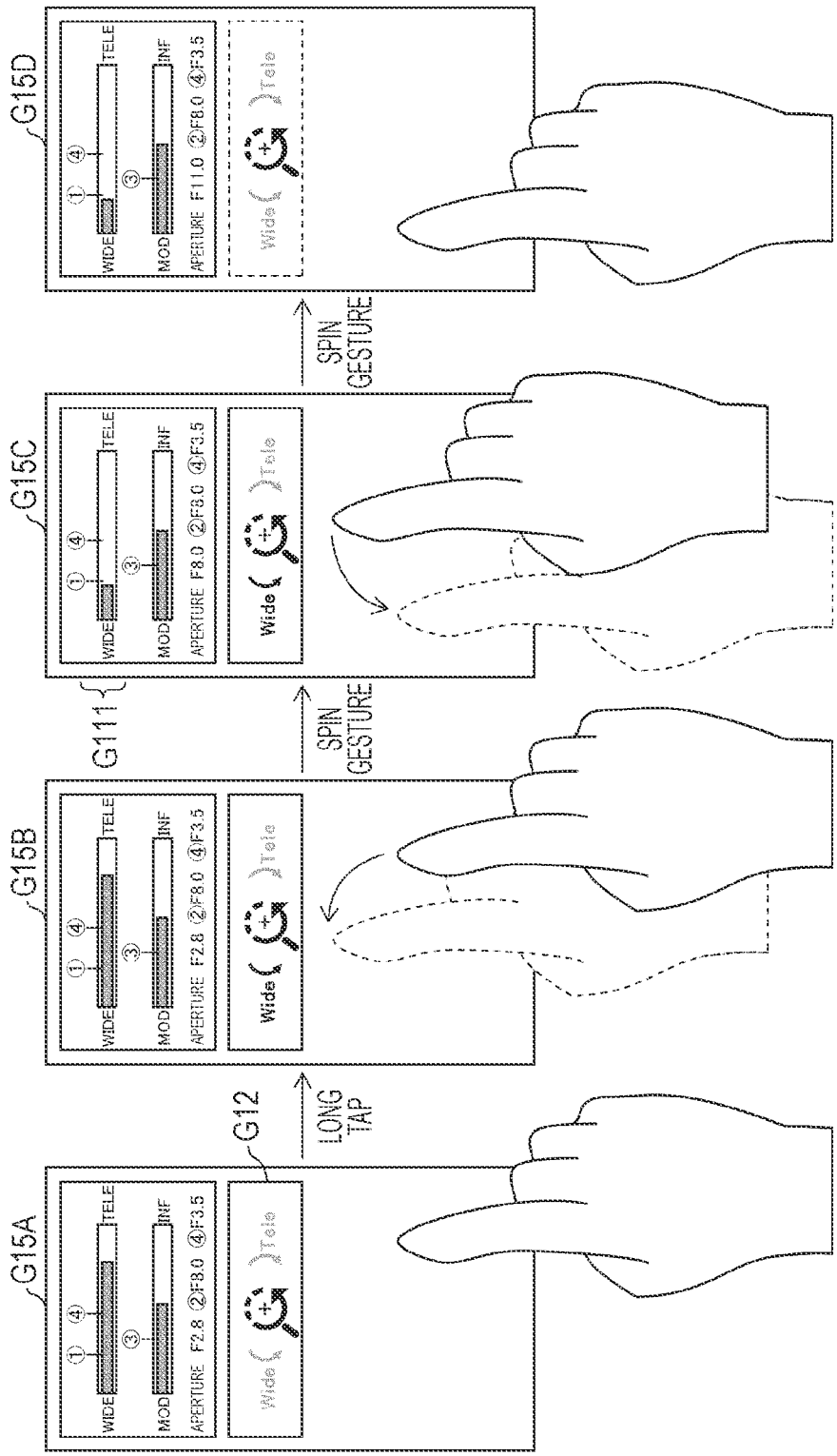
FIG. 6 is a view illustrating specific examples of a gesture command input to the touch panel and transition of a screen displayed on the touch panel for zoom control in the operation terminal illustrated in FIG. 1.

A method for inputting the spin gesture from the long tap will be described with reference to FIG. 6. In the embodiment, the spin gesture from the long tap is associated with zoom control. FIG. 6 is a view illustrating specific examples of a gesture command input to the touch panel 21 and transition of a screen displayed on the touch panel 21 for the zoom control in the operation terminal 20 illustrated in FIG. 1. Screens G15A, G15B, G15C, and G15D illustrated in FIG. 6 are screens displayed on the display of the touch panel 21 to transition in this order while the detection process S11, the identification process S12, the zoom change calculation process S151, the zoom magnification calculation process S152, and the zoom control process S153 described above are being executed.

On the screen G15A, the user long-taps any area of the screen G15A. The processor 22 displays a GUI (a ring imitating a magnifying glass) illustrating that the zoom control is in the standby state and GUIs (gray arrows on both sides) illustrating an operation method in the zoom control.

On the screen G15B, the user slides the touch position in the counterclockwise direction on the substantially circular orbit, thereby inputting the counterclockwise spin gesture. The processor 22 displays a GUI (a counterclockwise black arrow on the left side) illustrating that the change of the zoom magnification to the wide-angle side (Wide direction) is being executed as the feedback display section G12.

On the screen G15C, the user continues to input the counterclockwise spin gesture. The processor 22 changes the display of the zoom magnification display section G111, and displays, as the zoom magnification display section G111, a GUI illustrating that the change of the zoom magnification to the wide-angle side (wide direction) has been executed.

The user stops the spin gesture when confirming that the zoom magnification has changed to a desired zoom magnification by viewing the display of the zoom magnification display section G111 on the screen G15D. The processor 22 changes the feedback display section G12 to display the GUI (the ring imitating the magnifying glass) illustrating that the zoom control is in the standby state and the GUIs (the gray arrows on both sides) illustrating the operation method in the zoom control.

(Method for Inputting Swipe Gesture Using Two Fingers)

Figure 7:
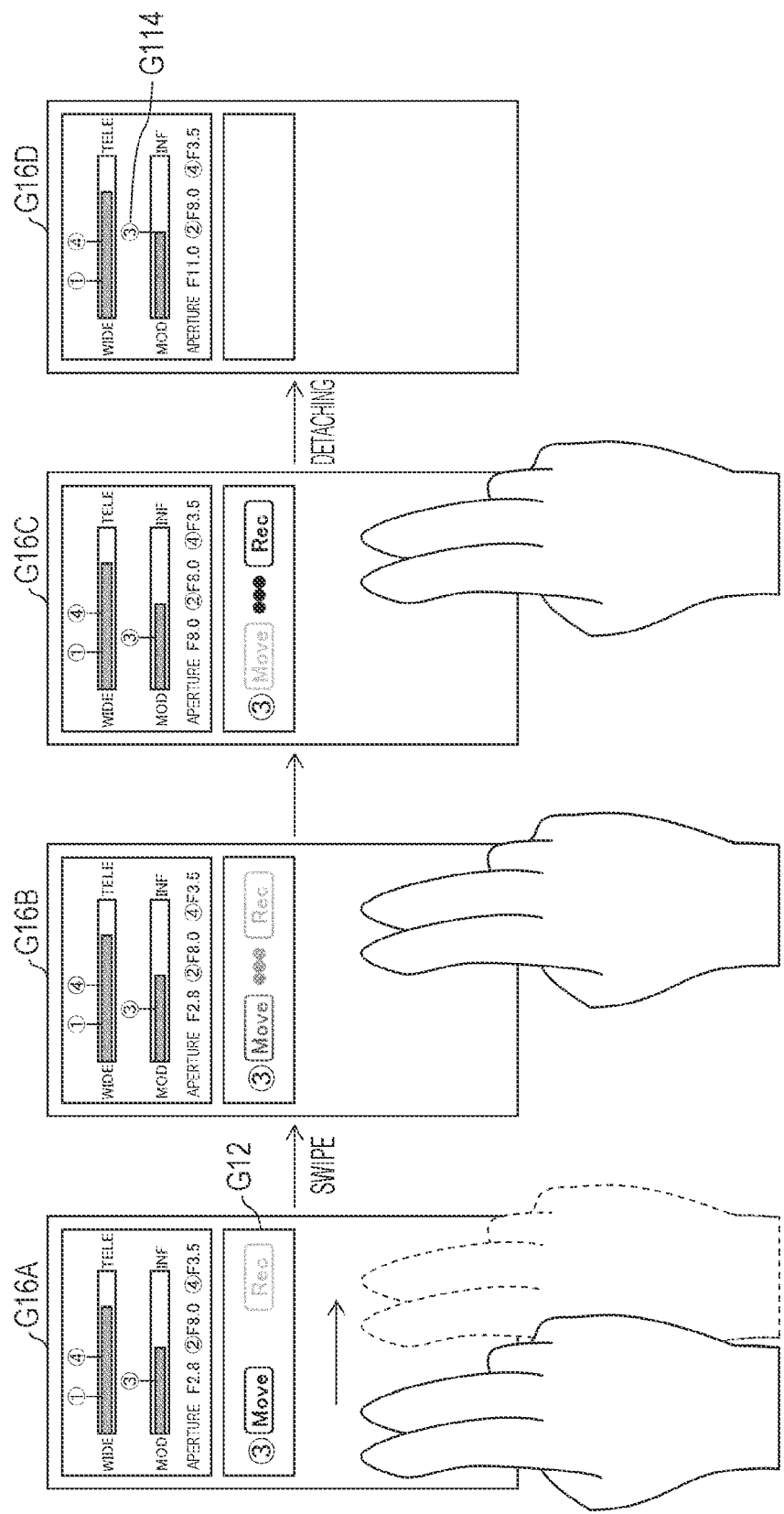
FIG. 7 is a view illustrating specific examples of a gesture command input to the touch panel and transition of a screen displayed on the touch panel for preset storage in the operation terminal illustrated in FIG. 1.

A method for inputting the swipe gesture using two fingers will be described with reference to FIG. 7. In the embodiment, the swipe gesture using two fingers is associated with preset storage. FIG. 7 is a view illustrating specific examples of a gesture command input to the touch panel 21 and transition of a screen displayed on the touch panel 21 for the preset storage in the operation terminal 20 illustrated in FIG. 1; and Screens G16A, G16B, G16C, and G16D illustrated in FIG. 7 are screens displayed on the display of the touch panel 21 to transition in this order while the detection process S11, the identification process S12, the storage area selection process S161, and the preset writing process S162 described above are being executed.

On the screen G16A, the user touches any area of the screen G16A using two fingers, and then, slides the touch positions linearly rightward, thereby inputting the swipe gesture using two fingers. The processor 22 displays, as the feedback display section G12, a GUI (circled "3") illustrating a number corresponding to the rightward direction, which is the swipe direction, a GUI ("Move" in dark gray) illustrating that preset restoration is in the standby state, and a GUI ("Rec" in light gray) illustrating that the preset storage is in the standby state.

On the screen G16B, the user does not move the hand H, that is, maintains the slid touch position. The processor 22 displays the GUI ("Move") illustrating that the preset restoration is in the standby state and the GUI ("Rec") illustrating that the preset storage is in the standby state and changes shading of the GUIs in accordance with the duration of the state in which the touch position is maintained. That is, the processor 22 changes the GUI of the feedback display section G12 such that a character color of "Move" gradually becomes lighter and a character color of "Rec" gradually becomes darker.

On the screen G16C, the user continues to maintain the slid touch position. The processor 22 continues to change the GUI of the feedback display section G12.

On the screen G16D, after the duration of the state in which the touch position is maintained exceeds a threshold and the character color of "Rec" becomes darker than the character color of "Move", the user detaches the hand. The processor 22 stops the display of the feedback display section G12. In addition, the processor 22 displays, as the preset display section G114, a GUI illustrating that the current focus position is stored as the preset information in the storage area 313 corresponding to the number "3". For example, in FIG. 7, the processor 22 changes the position of the circled "3" from the position of "3" on the screen G16C to the position of the right end of the bar of the focus position display section G112 on the screen G16C.

(Method for Inputting Flick Gesture Using Two Fingers)

Figure 8:
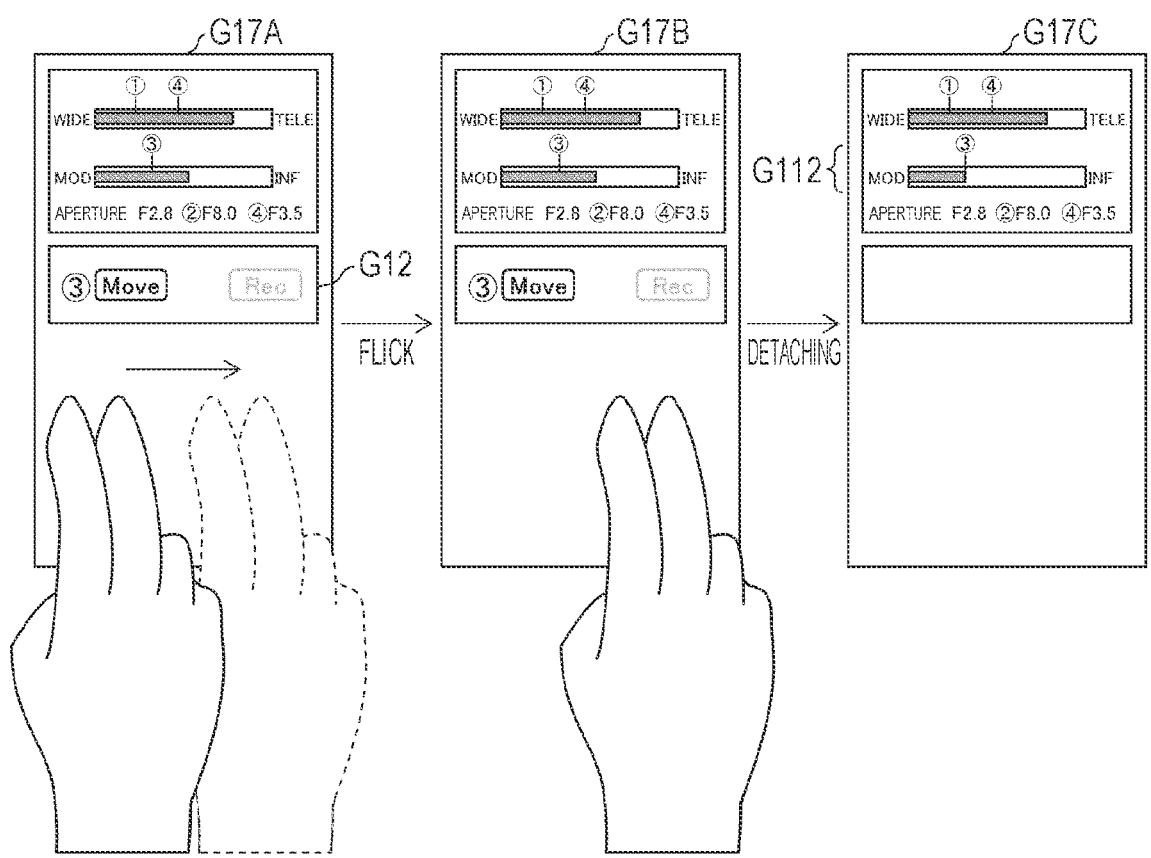
FIG. 8 is a view illustrating specific examples of a gesture command input to the touch panel and transition of a screen displayed on the touch panel for preset restoration in the operation terminal illustrated in FIG. 1.

A method for inputting the flick gesture using two fingers will be described with reference to FIG. 8. In the embodiment, the flick gesture using two fingers is associated with preset restoration. FIG. 8 is a view illustrating specific examples of a gesture command input to the touch panel 21 and transition of a screen displayed on the touch panel 21 for the preset restoration in the operation terminal 20 illustrated in FIG. 1. Screens G17A, G17B, and G17C illustrated in FIG. 8 are screens displayed on the display of the touch panel 21 to transition in this order while the detection process S11, the identification process S12, the storage area selection process S171, the preset reading process S172, and the optical system control process S173 described above are being executed.

On the screen G17A, the user touches any area of the screen G17A using two fingers, and then, moves the touch positions in a manner of linearly flicking rightward, thereby inputting the flick gesture using two fingers. The processor 22 displays, as the feedback display section G12, a GUI (circled "3") illustrating a number corresponding to the rightward direction, which is the flick direction, a GUI ("Move" in dark gray) illustrating that preset restoration is in the standby state, and a GUI ("Rec" in light gray) illustrating that the preset storage is in the standby state.

On the screen G17B, the user maintains the slid touch position or detaches the hand. Here, a case where the user maintains the slid touch position will be described for convenience. The processor 22 displays the GUI ("Move") illustrating that the preset restoration is in the standby state and the GUI ("Rec") illustrating that the preset storage is in the standby state and changes shading of the GUIs in accordance with the duration of the state in which the touch position is maintained. That is, the processor 22 changes the GUI of the feedback display section G12 such that a character color of "Move" gradually becomes lighter and a character color of "Rec" gradually becomes darker.

On the screen G17C, the user detaches the hand before the character color of "Rec" becomes darker than the character color of "Move". The processor 22 stops the display of the feedback display section G12. In addition, the processor 22 displays, as the focus position display section G112, a GUI illustrating that the current focus position has moved such that the current focus position coincides with the focus position read as the preset information from the storage area 313 corresponding to the number "3". For example, in FIG. 8, the processor 22 changes a position of a right end of the bar of the focus position display section G112 from a position of the right end of the bar on the screen G17B to a position of "3" on the screen G17B.

Note that the user may immediately detach the hand without maintaining the touch position on the screen G17B. If the user detaches the hand before the character color of "Rec" becomes darker than the character color of "Move", the storage area selection process S171, the preset reading process S172, and the optical system control process S173 are executed, and corresponding GUIs are displayed.

(Method for Inputting Flick Gesture Using Three Fingers)

A method for inputting the flick gesture using three fingers is the same as the above-described method for inputting the flick gesture using two fingers except that input is performed using three fingers instead of two fingers, and thus, the description thereof with reference to the drawing will be omitted.

When the user inputs the flick gesture using three fingers, the processor 22 displays a GUI indicating that the allowable range of the focus position has been set as the focus position display section G112.

Effect of Embodiment

As described above, the lens system 100 according to the embodiment includes: the lens 10; the operation terminal 20 including the touch panel 21, the operation terminal being separated from the lens 10; and the controller 30 that controls the lens 10 in accordance with the gesture command input to the touch panel 21.

According to such a configuration, it is possible to achieve a technique capable of controlling the lens 10 by a simple operation while reducing or avoiding a shake. For example, propagation of vibration of the touch panel 21 caused by inputting the gesture command to the lens 10 is reduced or avoided, the shake of the lens 10 is reduced or avoided. In addition, the user can operate the lens 10 by the gesture command without memorizing an operation required to operate the lens 10, such as rotation of a ring, pressing of a button, and switching of a switch. In addition, the operation with the gesture command does not necessarily require an operation (for example, an operation of touching a virtual button, switch, or lever displayed as a GUI on the touch panel 21) of setting a specific position of the touch panel 21 as a first touch position (that is, a base point). Therefore, the user can perform capturing while paying attention only to a subject without viewing the GUI on the touch panel 21. Such a lens system 100 can be suitably used as a tool for performing capturing by a small number of people (for example, one person). For example, the user can hold the operation terminal 20 in the hand and operate the lens 10 arranged at any position with any orientation (for example, at a position 10 m away from the user toward the user himself/herself).

In the lens system 100 according to the embodiment, the lens 10 is the lens that can be mounted on the camera, and the controller 30 is built in the lens 10 or the camera.

According to such a configuration, the controller 30 is built in the lens 10 itself or the camera on which the lens 10 has been mounted. Therefore, the gesture command by the user is reflected in the control of the lens 10 without delay, and thus, the lens system 100 can be suitably used as the tool for video capturing in which an operation by the user is required at any time even during the capturing.

In the lens system 100 according to the embodiment, the controller 30 executes the focus control, the aperture control, or the zoom control of the lens 10 in accordance with the spin gesture.

According to such a configuration, it is possible to implement manual control of the focus position, the aperture value, or the zoom magnification of the lens 10 by a simple operation. The lens is often automatically controlled in capturing with a small number of people. However, automatic control has a problem that the lens may be caused to perform an operation that is not intended by the user. As an example, pupil autofocus (AF) is exemplified in which a focus group is automatically controlled such that a focus position follows a pupil of a subject. In the case of using the pupil AF, the focus position follows a person having a pupil by the automatic control even when it is desired to align the focus position with an object having no pupil. Therefore, the user may be required to perform an involuntary operation of hiding a pupil by the hand in order to control the focus position on a subject having no pupil while ignoring the person having the pupil during video capturing. Due to such a problem, the user may be required to manually control the lens even in the capturing with a small number of people. In the lens system 100 of the embodiment, for example, the user, who serves as a camera man and a subject, can manually control the lens 10 by the simple operation while holding the operation terminal 20 in the hand, and thus, the user can perform capturing without the involuntary operation as described above.

In addition, the lens 10 can be continuously controlled according to such a configuration. Among general inputs with respect to the touch panel, a gesture command of linearly moving one finger, such as the swipe gesture or the flick gesture, has a trajectory extending linearly and being intermittent, and thus, is not suitable for the user to continuously perform the input on the touch panel. A pinch gesture (a gesture command of changing a distance between two touch positions) and a rotation gesture (a gesture command of changing a positional relationship between a touch position serving as a rotation axis and a touch position that is rotationally moved) also require the operation using two fingers, and thus, is not suitable for a long-term input. On the other hand, if the spin gesture having the substantially circular trajectory is used, the user can repeatedly rotate the touch position on the touch panel, temporarily stop the rotation, or reverse the rotation halfway. Therefore, the user can continuously perform the input on the touch panel 21 without interruption if the spin gesture is used. In addition, an operation speed can be finely adjusted by changing a speed at which the finger is moved. In addition, in a case where the spin gesture is input using one finger, the user is less likely to be stressed by the input operation even if the user performs the input for a long period of time. Therefore, the lens system 100 can be used as a tool suitable for still image capturing or video capturing in which continuous and fine adjustment of the optical system is required, and video capturing in which long-term adjustment of the optical system is required.

Further, in the embodiment, the gesture commands associated with the focus control, the aperture control, and the zoom control are input by one finger, and the gesture commands associated with the preset storage, the preset restoration, and the allowable range setting are input by two or more fingers. According to such a configuration, the input using one finger and the input using two or more fingers are distinguished with good accuracy. Therefore, erroneous recognition in the identification process S12 is reduced or avoided even if a trajectory of the spin gesture is partially linear.

In addition, which control among the focus control, the aperture control, and the zoom control is to be executed by the controller 30 is determined in accordance with the presence/absence or the type of the gesture command input immediately before the spin gesture in the lens system 100 according to the embodiment.

According to such a configuration, the user can select a target to be controlled by a simple operation. In order to control a specific one of a plurality of targets in a general input with respect to a touch panel, it is necessary to change a mode by touching a GUI, such as a button, to change the control target or to assign different gestures to the plurality of targets, respectively. However, the user needs to view the GUI on the screen in the case where the mode is changed by touching the GUI. In addition, in the case where the different gestures are assigned to the plurality of targets, respectively, the user needs to memorize the plurality of gestures in accordance with the number of types of targets. The lens system 100 determines the control target with reference to the gesture command immediately before the spin gesture, and thus, the user can change the mode without viewing the GUI, and the time and effort for memorizing the plurality of gestures are not required.

In the lens system 100 according to the embodiment, the controller 30 writes the current focus position, the current aperture value, or the current zoom magnification of the lens 10 as the preset information in the memory 31 in accordance with the swipe gesture.

According to such a configuration, the user first stores the current control state of the lens system 100 in the memory 31 as the preset information, and then, can perform capturing that utilizes the stored preset information. In addition, the swipe gesture is an intermittent operation, and thus, is suitable as a command gesture for instructing writing of the preset information which is one-time processing.

In the lens system 100 according to the embodiment, the memory 31 includes the plurality of storage areas 311, 312, 313, and 314, and the storage area into which the controller 30 writes the preset information is determined in accordance with the swipe direction.

According to such a configuration, the user can store a plurality of pieces of the preset information in the memory 31 and perform capturing that utilizes the plurality of pieces of preset information. In addition, the swipe gesture is a linear operation, and erroneous recognition of the swipe direction hardly occurs, and thus, there are few erroneous operations in selecting the storage area in accordance with the swipe direction.

In the lens system 100 according to the embodiment, the controller 30 set the focus position, the aperture value, or the zoom magnification of the lens 10 on the basis of the focus position, the aperture value, or the zoom magnification read from the memory 31 as the preset information in accordance with the flick gesture.

According to such a configuration, the user can restore the control state of the lens system 100 stored as the preset information in the memory 31 in advance by the simple operation at any timing. Examples of a method for restoring a predetermined control state in order to follow a subject include a method of using an additional tool such as follow focus. However, the follow focus may request the user to perform an operation without moving away from the camera and to mark a corresponding ring position in order to record an intended control state. However, according to the lens system 100 of the embodiment, the user can leave the camera if causing the intended control state to be stored in advance as the preset information, and can restore the control state by the simple operation without viewing the GUI of the operation terminal 20. In addition, it is unnecessary to provide an additional tool according to the lens system 100 of the embodiment, and thus, the camera including the lens 10 can be reduced in weight, manufactured at low cost, and easily installed, and a control loss due to a gear included in the additional tool can be reduced.

In the lens system 100 according to the embodiment, the controller 30 sets the focus position of the lens 10 in accordance with the flick gesture, and further sets the allowable range of the focus position of the lens 10 in the autofocus mode on the basis of the set focus position in accordance with the number of fingers performing the flick gesture.

According to such a configuration, the user can control the lens 10 by combining restoration of the focus position, which is manual control, and the autofocus which is automatic control. In particular, an autofocus range can be limited to an intended range according to such a configuration, and thus, for example, the focus position can be intentionally shifted from a subject, or the focus position can be adjusted to only a part of a plurality of subjects.

In the lens system 100 according to the embodiment, the memory 31 includes the plurality of storage areas 311, 312, 313, and 314, and the storage area from which the controller 30 reads the preset information is determined in accordance with the flick direction.

According to such a configuration, the user can restore one specific control state among a plurality of control states of the lens system 100 stored as the preset information in the memory 31 in advance by the simple operation at any timing. For example, the user may sequentially operate the lens system 100 from any control state to a first control state stored as the preset information and then to a second control state stored as the preset information. Such an effect is particularly advantageous in video capturing that adopts a stage effect in which the focus position, the aperture value, and the zoom magnification transition change.

In the lens system 100 according to the embodiment, the controller 30 sets the allowable range of the focus position of the lens 10 in the autofocus mode on the basis of the current focus position of the lens 10 in accordance with the flick gesture and the number of fingers performing the flick gesture.

According to such a configuration, it is possible to achieve a technique capable of controlling the lens 10 by a simple operation while reducing or avoiding a shake.

Modifications of Embodiment

The configuration in which the electronic component provided in the smartphone is used as the touch panel 21 has been described above as the embodiment. In the invention, however, the touch panel 21 may be a virtual touch panel implemented on a computer. In such a configuration, the user can input the gesture command to the virtual touch panel 21 using a pointing device. Examples of the pointing device include a mouse, a touch pen, a touch pad, and the like.

The configuration in which the spin gesture in (1) and the focus control, the spin gesture from the double tap in (2) and the aperture control, and the spin gesture from the long tap in (3) and the zoom control are associated with each other as each of sets have been described above as the embodiment. In the invention, however, these associations can be changed, and any spin gesture may be associated with any one, two, or three of the control processes. For example, the spin gesture in (1) may be associated with the focus control and the aperture control as a set. In addition, for example, the spin gesture in (1) and the spin gesture from the double tap in (2) may be associated with the zoom control as a set. These sets may be customizable by the user in accordance with a purpose.

In addition, the configuration in which the swipe gesture using two fingers in (4) and the preset storage, the flick gesture using two fingers in (5) and the preset restoration, and the flick gesture using three fingers in (6) and the allowable range setting are associated with each other as each of sets have been described above as the embodiment. However, these sets can be randomly changed in an embodiment of the invention. For example, the swipe gesture using two fingers in (4) and the preset restoration may be paired.

In the invention, the correspondence between the rotation direction of the spin gesture and a change direction of each of the focus position, the aperture value, and the zoom magnification can be customized by the user.

In the invention, the time required until the focus position, the aperture value, or the zoom magnification is set in the optical system control process S173 after detection of the flick gesture using two fingers in the detection process S11 and the identification process S12 may be customizable by the user in accordance with a purpose. This time may be extremely short (for example, 0.1 seconds), or may be one second, two seconds, or more. The user can select a stage effect in video capturing by customizing this time.

In the invention, the processing subject that executes each of the identification process S12, the focus change calculation process S131, the focus position calculation process S132, the aperture change calculation process S141, the aperture value calculation process S142, the zoom change calculation process S151, the zoom magnification calculation process S152, the storage area selection processes S161 and S171, and the allowable range calculation process S181 may be either the operation terminal 20 or the controller 30. For example, the operation terminal 20 may transmit information on the touch position detected in the detection process S11 to the controller 30, and the controller 30 may calculate the change amount on the basis of the touch position.

In the invention, the focus control process S133, the aperture control process S143, and the zoom control process S153 may be executed without executing each of the focus position calculation process S132, the aperture value calculation process S142, and the zoom magnification calculation process S152. For example, the controller 30 may execute the focus control process S133 by changing the focus position by the calculation result of the change amount of the focus change calculation process S131 without calculating the target focus position.

In the invention, the camera and the operation terminal 20 may be communicably connected to each other in a direct manner or in an indirect manner via the lens 10. In such a configuration, the processor 22 provided in the operation terminal 20 may transmit any command signal such as on and off of a shutter and a power supply to the camera. In addition, the processor provided in the camera may transmit a moving image acquired by the camera to the operation terminal 20, and the processor 22 provided in the operation terminal 20 may display the acquired moving image on the display of the touch panel 21. In an embodiment, the acquired moving image may be displayed as the background of the control state display section G11 and the feedback display section G12 described above. According to such an embodiment, the user can operate the lens 10 while confirming the acquired moving image using the operation terminal 20 at hand.

Additional Notes

The invention is not limited to the above-described embodiments, and various modifications can be made within the scope indicated in the claims, and embodiments obtained by appropriately combining technical means disclosed in different embodiments are also included in the technical scope of the invention encompass.

What is claimed is:

1. A lens system comprising:
a lens;
an operation terminal separated from the lens, the operation terminal including a touch panel; and
a controller configured to control the lens in accordance with a gesture command input to the touch panel, wherein
the controller is configured to execute focus control, aperture control, or zoom control of the lens in accordance with a spin gesture,
switching between the focus control, the aperture control, and the zoom control is to be executed by the controller is determined in accordance with presence/absence and a type of a gesture command input immediately before the spin gesture, and
the type of the gesture command input immediately before the spin gesture is distinguished regardless of a location of the gesture command input on the touch panel.

2. The lens system according to claim 1, wherein
the lens is mountable on a camera, and
the controller is built in the lens or the camera.

3. The lens system according to claim 1, wherein
the controller is configured to write a focus position, an aperture value, or a zoom magnification of the lens at current time into a memory as preset information in accordance with a swipe gesture.

4. The lens system according to claim 3, wherein
the memory includes a plurality of storage areas, and
a storage area into which the controller writes the preset information is determined in accordance with a swipe direction.

5. The lens system according to claim 3, wherein
the controller is configured to set a focus position, an aperture value, or a zoom magnification of the lens based on the focus position, the aperture value, or the zoom magnification read from the memory as the preset information in accordance with a flick gesture.

6. The lens system according to claim 5, wherein
the controller is configured to
set a focus position of the lens in accordance with the flick gesture, and
further set an allowable range of the focus position of the lens in an autofocus mode based on the set focus position in accordance with a number of fingers performing the flick gesture.

7. The lens system according to claim 5, wherein
the memory includes a plurality of storage areas, and
a storage area from which the controller reads the preset information is determined in accordance with a flick direction.

8. The lens system according to claim 1, wherein
the controller is configured to set an allowable range of a focus position of the lens in an autofocus mode based on a current focus position of the lens in accordance with a flick gesture and a number of fingers performing the flick gesture.

9. The lens system according to claim 1, wherein
the touch panel is configured to display a screen including a control state display area and a feedback display area,
the control state display area displays a control state of the lens, and
the feedback display area displays a feedback of the spin gesture.

\* \* \* \* \*